US012600083B2

(12) United States Patent
Müller et al.

(10) Patent No.: US 12,600,083 B2
(45) Date of Patent: Apr. 14, 2026

(54) ELECTRO-SPINNING/WRITING SYSTEM AND CORRESPONDING METHOD

(71) Applicant: Technische Universität München, Munich (DE)

(72) Inventors: Kilian Müller, Munich (DE); Sarah Burkhardt, Munich (DE); Stefan Leonhardt, Munich (DE); Sebastian Tobias Pammer, Munich (DE); Petra Mela, Garching bei München (DE); Johannes Schweiger, Kolsass (AT)

(73) Assignee: TECHNISCHE UNIVERSITÄT MÜNCHEN, Munich (DE)

(*) Notice: Subject to any disclaimer, the term of this patent is extended or adjusted under 35 U.S.C. 154(b) by 88 days.

(21) Appl. No.: 18/254,199

(22) PCT Filed: Dec. 1, 2021

(86) PCT No.: PCT/EP2021/083812
§ 371 (c)(1),
(2) Date: May 24, 2023

(87) PCT Pub. No.: WO2022/117667
PCT Pub. Date: Jun. 9, 2022

(65) Prior Publication Data
US 2024/0001606 A1    Jan. 4, 2024

(30) Foreign Application Priority Data
Dec. 2, 2020    (EP) ..................................... 20211278

(51) Int. Cl.
B29C 64/118 (2017.01)
B29C 64/232 (2017.01)
(Continued)

(52) U.S. Cl.
CPC .......... B29C 64/118 (2017.08); B29C 64/232 (2017.08); B29C 64/295 (2017.08);
(Continued)

(58) Field of Classification Search
CPC ..... B29C 64/10; B29C 64/118; B29C 64/188; B29C 64/194; B29C 64/205;
(Continued)

(56) References Cited

U.S. PATENT DOCUMENTS 6,838,035 B1 * 1/2005 Ederer ..................... B22C 23/00
347/54
10,500,796 B1 * 12/2019 Lazarovits ............ B29C 64/129
(Continued)

FOREIGN PATENT DOCUMENTS

CN    106222085 B    3/2019
CN    106948014 B    3/2019
(Continued)

OTHER PUBLICATIONS

The Engineering ToolBox (2008). Liquids—Dielectric Constants. [online] Available at: https://www.engineeringtoolbox.com/liquid-dielectric-constants-d_1263.html [Accessed Oct. 10, 2025). (Year: 2008).*

(Continued)

*Primary Examiner* — JaMel M Nelson
(74) *Attorney, Agent, or Firm* — Grossman, Tucker, Perreault & Pfleger, PLLC

(57) ABSTRACT

A system for electro-spinning/writing of a polymer material, the system comprising a print-head configured to eject the polymer material via a nozzle, a collector configured to receive the polymer material ejected from the nozzle, a displacement assembly configured to adjust a distance between the print-head and the collector, and a vat containing or configured to contain a liquid, wherein the vat is (Continued)

further configured to receive the collector, wherein the displacement assembly is configured to retract the collector and at least a part of the polymer material received by the collector into the liquid in the vat in accordance with a height of the received polymer material.

13 Claims, 5 Drawing Sheets

(51) Int. Cl.
| | |
|---|---|
| *B29C 64/295* | (2017.01) |
| *B33Y 10/00* | (2015.01) |
| *B33Y 30/00* | (2015.01) |
| *D01D 5/00* | (2006.01) |

(52) U.S. Cl.
CPC .............. *B33Y 10/00* (2014.12); *B33Y 30/00* (2014.12); *D01D 5/0023* (2013.01); *D01D 5/0076* (2013.01); *B29K 2995/0005* (2013.01)

(58) Field of Classification Search
CPC ... B29C 64/209; B29C 64/227; B29C 64/232; B29C 64/295; B29C 64/30; B33Y 10/00; B33Y 30/00; D01D 5/00; D01D 5/0007; D01D 5/0023; D01D 5/0076
See application file for complete search history.

(56) References Cited

U.S. PATENT DOCUMENTS

| | | | | |
|---|---|---|---|---|
| 2014/0094551 A1* | 4/2014 | Koslow | ...................... | C08J 3/02 |
| | | | | 524/413 |
| 2018/0021485 A1* | 1/2018 | Nishikawa | ............... | A61K 9/70 |
| | | | | 424/426 |
| 2018/0243982 A1* | 8/2018 | Shanjani | ............... | B29C 64/364 |
| 2018/0243986 A1* | 8/2018 | Seo | ....................... | B29C 64/118 |
| 2020/0200953 A1* | 6/2020 | Hanano | .................. | B33Y 80/00 |
| 2020/0361146 A1* | 11/2020 | Zhou | ..................... | B29C 64/209 |

FOREIGN PATENT DOCUMENTS

| | | |
|---|---|---|
| JP | 2003-511272 | 3/2003 |
| JP | 2018-127745 | 8/2018 |
| WO | 01/26885 | 4/2001 |

OTHER PUBLICATIONS

International Search Report and Written Opinion of International Application No. PCT/EP2021/083812, mail date Mar. 22, 2022, 16 pages.

Toby D. Brown et al., Direct Writing By Way of Melt Electrospinning, Advanced Materials, 2011, vol. 23, pp. 5651-5657, Wiley-VCH, Weinheim.

Paul D. Dalton et al., Electrospinning and Additive Manufacturing: Converging Technologies, The Royal Society of Chemistry, Oct. 22, 2012, 14 pages.

Gernot Hochleitner et al., Additive Manufacturing of Scaffolds with Sub-Micron Filaments via Melt Electrospinning Writing, Biofabrication, Jun. 12, 2015, IOP Publishing.

Erin Mccoll et al., Design and Fabrication of Melt Electrowritten Tubes Using Intuitive Software, Materials and Design, pp. 46-58, vol. 155, 2018, Elsevier Ltd.

Thomas M. Robinson et al., The Next Frontier in Melt Electrospinninh: Taming the Jet, Advanced Functional Materials, 2019, vol. 29, Wiley-VCH, Weinheim.

Navid T. Saidy et al., Melt Electrowriting of Complex 3D Anatomically Relevant Scaffolds, Frontiers in Bioengineering and Biotechnology, Jul. 24, 2020, vol. 8, Article 793.

Nikola Ristovski et al., Improved Fabrication of Melt Electrospun Tissue Engineering Scaffolds Using Direct Writing and Advanced Electric Field Control, Biointer Phase—A Journal of Biomaterials and Biological Interfaces, Mar. 25, 2015, vol. 10, No. 1.

A.F. Spivak & Y.A. Dzenis, Asymptotic Decay of Radius Weakly Conductive Viscous Jet in an External Electric Field, Applied Physics Letter, Nov. 23, 1998, vol. 73, No. 21.

Geoffrey Taylor, Electrically Driven Jets, Proceedings of the Royal Society of London. Series A, Mathematical and Physical Sciences, vol. 313, No. 1515. Dec. 2, 1969, pp. 453-475.

FM Wunner et al., Electrospinning With Polymer Melts—State of the Art and Future Perspectives, Comprehensive Biomaterials, 2017, vol. 5, pp. 217-235, Elsevier Ltd.

Felix M. Wunner et al., Electrospinning Writing with Molten Poly (e-caprolactone) from Different Directions—Examining the Effects of Gravity, Materials Letters, vol. 216, pp. 114-118, Elsevier Ltd.

Felix M. Wunner et al., Melt Electrospinning Writing of Highly Ordered Large Volume Scaffold Architectures, Advanced Materials, 2018, vol. 30, Wiley-VCH, Weinheim.

Office Action from related Japanese Appln. No. 2023-527812, dated Jan. 27, 2026. English translation attached.

* cited by examiner

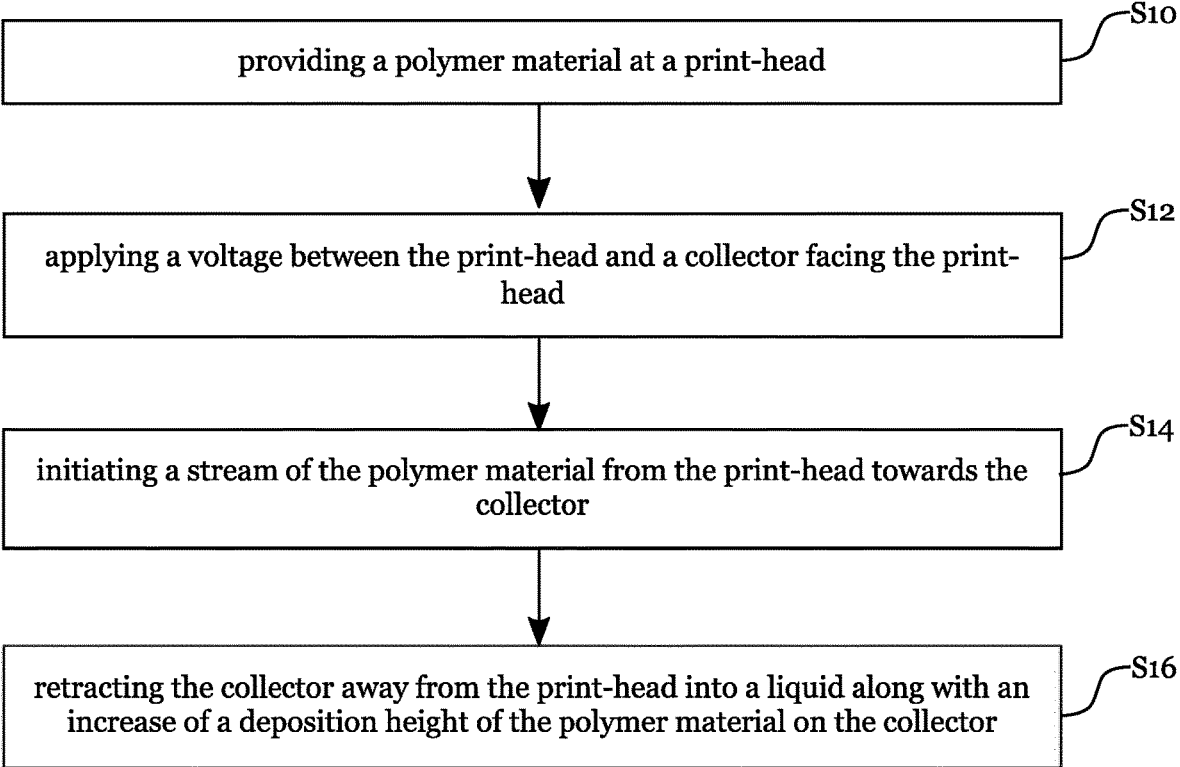

providing a polymer material at a print-head ⌐S10 applying a voltage between the print-head and a collector facing the print-head ⌐S12 initiating a stream of the polymer material from the print-head towards the collector ⌐S14 retracting the collector away from the print-head into a liquid along with an increase of a deposition height of the polymer material on the collector ⌐S16

Fig. 2

ELECTRO-SPINNING/WRITING SYSTEM AND CORRESPONDING METHOD

FIELD OF THE INVENTION

The present invention is in the field of additive manufacturing. More precisely, the present invention relates to electro-spinning/writing of polymer structures with an extended build height.

BACKGROUND

Additive manufacturing relies on the sequential deposition of a build material to gradually build a complete part from sequentially deposited material layers based on a virtual copy of the intended structure. Usually, a relative movement between a print-head and a build plate is driven to define the geometry of one material layer in a two-dimensional plane. When subsequent layers are deposited on top of the previously deposited layers, a three-dimensional structure can be progressively constructed.

Electro-spinning/writing is a technique wherein a flow of a polymer material from an emitter towards a collector is stabilized via an electric field. For example, a polymer may be provided in molten form by a conductive nozzle and may be directed from the nozzle onto a conductive collector plate by a high-voltage electric field, in a technique called Melt-Electro(spinning)-Writing. The electric field may charge the polymer material and pull the polymer material into streams with a thickness that is smaller than the nozzle diameter while the charged polymer material is attracted by the collector.

The polymer stream may bridge the gap between the emitter and the collector while cooling and/or evaporating solvent material, such that a solid or solidifying polymer material is deposited on the collector. By controlling the voltage, the distance between the emitter and the collector, and the flow rate of the polymer material at the emitter, the polymer material may be deposited at a pre-defined position on the collector, or may be spun into thin fibers deposited semi-randomly in a deposition region of the collector. Three-dimensional shapes of the polymer material may then be generated by sequentially depositing multiple layers of the polymer material.

Wunner et al. ("*Melt Electrospinning Writing of Highly Ordered Large Volume Scaffold Architectures*", Adv. Mater. 30 (2018) 1706570) disclose a Melt Electrospinning Writing (MEW) system with a spinneret and a collector plate facing each other, wherein an applied high-voltage drives the polymer melt from the spinneret onto the collector. To fabricate structures with build heights greater than 2-3 mm, the collector is dynamically distanced from the spinneret, such that the distance between the topmost layer of the deposited polymer melt and the spinneret remains constant. The voltage can be regulated at the same time, such that the electrostatic forces onto the polymer melt remain constant.

US 2018/243982 Ai discloses a hybrid deposition system comprising a thermoplastic molten-material extruder, a photo-polymerizing light source, and a pre-polymer vat. A controller can activate the molten-material extruder to deposit molten polymer on a substrate. The build platform and the received material can subsequently be immersed into the pre-polymer vat to form a layer of thermoset plastic using selective illumination with the photo-polymerizing light source.

CN 106 948 014 B discloses a three-dimensional melting electrostatic printing method for large-height micro-nano structures. The method comprises molten electrostatic printing of polymers on a build platform. Subsequently, a conductive medium is deposited with a solution printing nozzle, which is cross-linked to form a new receiving platform for subsequent layers.

CN 106 222 085 B teaches a composite scaffold and cell printing method, wherein the printer switches between electrostatic direct writing and a cell printing nozzle to form printed tissue and organs.

SUMMARY OF THE INVENTION

However, the known techniques and systems are still challenged by larger build heights as the deposition accuracy particularly at larger deposition heights is often limited.

In view of this state-of-the-art, the object of the invention is to provide an improved system for the controlled electro-spinning/writing of larger structures with an extended build height.

This object is solved by a system for and method of electro-spinning/writing according to the independent claims. The dependent claims relate to preferred embodiments.

According to a first aspect, the invention relates to a system for electro-spinning/writing of a polymer material. The system comprises a print-head configured to eject the polymer material via a nozzle, a collector configured to receive the polymer material ejected from the nozzle, and a displacement assembly configured to adjust a distance between the print-head and the collector. The system further comprises a vat containing or configured to contain a liquid, wherein the vat is further configured to receive the collector, and wherein the displacement assembly is configured to retract the collector and at least a part of the polymer material received by the collector into the liquid in the vat in accordance with a height of the received polymer material.

The inventors found that the deposition accuracy and also the maximum deposition height of electro-writing/spinning may be limited due to electric interactions between the polymer jet and the deposited polymer structures. The liquid may at least partially offset/mitigate the effect of the deposited polymer structures on the electric field distribution between the nozzle and the collector. In particular, the inventors found that the presence of the deposited polymer material on the collector can bend electric field lines due to the spatially varying dielectric constant and may therefore distort the deposition pattern of subsequent polymer layers.

The liquid in the vat may reduce a spatial variation of the relative dielectric constant and/or may provide a substantially flat potential reference plane close to the plane of deposition, such that the impact of structures protruding along the build direction onto the polymer material ejected by the nozzle can be at least partially compensated.

The liquid may also shield and/or accept charges in/from the deposited polymer material. For example, the liquid may shield electric charges in the deposited polymer material and/or may drain electric charges from the deposited polymer material below the liquid surface.

As a result, a more uniform electric field can be maintained between the nozzle and the uppermost layer of the deposited polymer material, and a deposition accuracy for polymer structures with structures protruding along the build height, e.g. perpendicular to the collector surface, may accordingly be increased as compared to the case where the structures are deposited in a uniform atmosphere, e.g. air, between the emitter and the collector. The system may therefore be advantageously employed for deterministic electro-writing of polymer structures, e.g. for the controlled manufacturing of implants or scaffolds for biomedical research applications with well-defined structural geometries. Further, since the liquid may shield and/or drain charges in/from the deposited polymer material, a maximum height for a manufactured polymer structure may be increased. Accordingly, the system may also be advantageously used in an electrospinning regime when depositing polymer material while applying an electric field between the nozzle and the collector.

The polymer material may be provided to the print-head in solid or liquid form, such as a solidified polymer or a polymer mixture which can be melted in the print-head, or a polymer material which is dissolved in a solvent. For example, the polymer material may comprise polypropylene, polyethylene, polyphenylene sulfide, polyamide, polylactic acid, polyphenylene sulfide, Poly(ether-ether ketone), poly(ethylene-co-vinyl)alcohol, Poly(1-lactic acid), starch, poly(3-hydroxybutyrate), Cyclic butylene terephthalate oligomer, acetyl tributyl citrate, Polystyrene, poly($\varepsilon$-caprolactone), Polylactide-poly(ethylene-glycol) Poly(vinylidene difluoride), Poly(hydroxymethyl-glycolide-co-$\varepsilon$-caprolactone), Poly(l-lactide-co-$\varepsilon$-caprolactone-co-acryloyl carbonate), Poly(urea-siloxane)s, or a mixture thereof, and may comprise functional additives, such as bioactive glass particles, reduced tungsten oxide, or hydroxyapatite, e.g. for the use in implants or artificial scaffolds for biomedical applications. However, the skilled person will appreciate that these substances are merely examples and the system and associated method can be generally used for a deposition of polymer fibers with most polymers having sufficient molecular entanglements to not break up into droplets due to Raleigh instabilities during a transfer between the nozzle and the collector. In addition, the system and disclosed techniques may also be advantageously employed for electro-spraying techniques, wherein a sequence of charged polymer droplets is directed from the print-head towards the collector.

In preferred embodiments, the system comprises a heater configured to melt polymer material to form a polymer melt to be ejected through the nozzle.

A polymer melt can have a higher viscosity than a polymer solution and may solidify over a shorter collector distance, such as a distance smaller than 10 mm, in particular a distance smaller than 8 mm, such as about 4 mm, between the collector and the nozzle, which may increase a control over the deposition location of the polymer material. Further, polymer melts may retain fewer charges than polymer solutions which may result in increased deposition accuracy and/or a maximum deposition height of the polymer material deposited in multiple layers. The polymer material may be fed to the nozzle in the form of filaments or granulates and may be heated in the print-head to form the polymer melt.

The polymer material may exit the print-head in at least partially liquid form and may be subjected to an electric field applied between a conductive nozzle and a conductive collector facing the print-head. The polymer material may be charged in the electric field at the nozzle and may be pulled towards the collector in the electric field. In some embodiments, the polymer material forms a continuous fluid column extending between the nozzle and the collector, while the polymer stream may taper from the nozzle towards the collector, e.g. form a Taylor cone at the nozzle and taper towards the collector. The polymer material may then be jetted from the tip of the Taylor cone towards the collector to form polymer fibers on the collector.

In preferred embodiments, a voltage is applied between the collector and the print-head, wherein the voltage is suitable for controlling a flow of polymer material from the print-head towards the collector.

The electric potential may be selected such that a stable fluid column is formed between the nozzle and the collector, wherein a flow of the polymer material may be substantially along the electrical field lines. For example, the electric potential may be larger than 100 V, in particular larger than 1 kV, e.g. between 1 kV and 100 kV, to stabilize a stream of the polymer material ejected from the nozzle and/or to direct the polymer material from the nozzle towards the collector.

In preferred embodiments, the system further comprises a voltage source configured to apply a selectable electric potential to the print-head and/or the collector.

The voltage source may apply electric potentials of opposite polarities to the nozzle and the collector or may apply a selectable electric potential to one of the nozzle and the collector while the other one of the nozzle and the collector is (electrically) grounded.

In preferred embodiments, the collector is (electrically) grounded, and the nozzle is configured to be held at a selectable electric potential, wherein the selectable electric potential is suitable for controlling a flow of polymer material from the print-head towards the collector.

When the collector is immersed into the liquid in the vat, an electric field at the nozzle induced by a charged collector may be partially compensated by a polarization of the liquid and may thus vary based on the immersion depth. By applying the electric potential to the nozzle while the collector is (electrically) grounded, the electric field strength acting on the polymer material ejected from the nozzle may be directly controlled by the electric potential. Further, applying the electric potential at the nozzle may simplify electrical insulation of the system as opposed to applying an electric potential to the at least partially immersed collector.

The polymer material ejected from the nozzle may be deposited in the form of polymer fibers while the print-head and the collector perform a relative movement in a two-dimensional plane. Preferably, the collector is held in the vat while the print-head moves in a two-dimensional plane to define the geometry of a two-dimensional layer of polymer fibers deposited onto the collector. The print-head may continuously deposit polymer fibers onto the collector to progressively deposit multiple layers of polymer fibers. However, in some embodiments, the system may be configured to deposit polymer droplets, e.g. in an electro-spraying mode of the print-head.

The displacement assembly can be configured to move the collector away from the nozzle in accordance with a height of the deposited polymer material. In some embodiments, the displacement assembly is configured to retract the collector away from the nozzle based on an elapsed time of depositing polymer material on the collector, wherein the collector may be retracted stepwise or continuously. Further, the displacement assembly may be configured to retract the collector away from the nozzle based on a deposition height. The deposition height may be estimated from an intended structure deposited by the print-head, or may be measured based on a height of a polymer structure received on the collector. Preferably, the displacement assembly is configured to retract the collector away from the nozzle after a predetermined estimated layer height has been deposited by the print-head, such as after each layer or after a predetermined number of layers deposited by the print-head onto the collector.

The movement of the displacement assembly may be controlled by a control system which may send control signals to an actuator of the displacement assembly. The control system may comprise a single control unit or may comprise a plurality of control units which may be functionally connected. The control units may comprise a microcontroller, an ASIC, a PLA (CPLA), an FPGA, or other control device, including control devices operating based on software, hardware, firmware, or a combination thereof. The control devices can include an integrated memory, or communicate with an external memory, or both, and may further comprise interfaces for connecting to sensors, devices, appliances, integrated logic circuits, other controllers, or the like, wherein the interfaces may be configured to receive or send signals, such as electrical signals, optical signals, wireless signals, acoustic signals, or the like.

A virtual replica of the three-dimensional geometry of an intended polymer structure may be provided in a memory of the control system or an external computing system and may comprise or be translated into control instructions for the displacement assembly to drive a motion of the print-head and/or the collector. The control system may then drive the displacement assembly in accordance with the control instructions for manufacturing the intended polymer structure and/or based on received signals, e.g. sensor readings.

In preferred embodiments, the system comprises a control system configured to control the displacement assembly such as to retract the collector further into the vat while the height of the received polymer material increases, wherein a retraction distance of the collector into the vat is in particular proportional to the height of the received polymer material.

The collector may rest at or close to a surface of the liquid in the vat at an initial stage of depositing the polymer material on the collector and may be retracted into the liquid in the vat during the deposition of the polymer material on the collector. Preferably, the retraction distance corresponds to the deposition height of the polymer on the collector, which may be estimated based on the deposition history of the polymer material. The skilled person will appreciate that the collector may be held at a constant (vertical) position during an initial deposition of the polymer material and may only be moved via the displacement assembly after a predetermined elapsed time and/or a predetermined height of the polymer material deposited on the collector. Further, the skilled person will appreciate that the movement of the collector may be driven in a stepwise manner, such that the retraction distance may only on average be proportional or correspond to the height of the received polymer material.

In preferred embodiments, the control system is configured to control the displacement assembly to immerse the collector into the liquid when the deposition height exceeds a height threshold.

For example, the collector may initially rest above the surface of the liquid in the vat to form layers of polymer material on the surface of the collector, and may be retracted into the liquid, such that the collector surface facing the print-head is immersed into the liquid, when the estimated or measured deposition height exceeds the height threshold, e.g. 10 μm, 100 μm, 1 mm, or 2 mm. In some embodiments, the collector rests above the surface of the liquid in the vat by the height threshold and is progressively retracted into the vat in accordance with the deposition height, such that the collector surface facing the print-head is immersed into the liquid, when the deposition height exceeds the height threshold.

The displacement assembly for adjusting a relative position of the collector along the build height may be arranged in the vat or may be partially arranged outside the vat to drive a movement of the collector and to immerse the collector in the liquid in accordance with the deposition height.

In preferred embodiments, the collector comprises a collector plate facing the print-head and a movable support protruding through an opening in a bottom of the vat, wherein the displacement assembly is configured to move the movable support through the opening to adjust a relative position of the collector/collector plate with respect to the print-head.

The opening may comprise a gasket to seal the bottom of the vat while the movable support is pulled through the opening. For example, the movable support may be a cylindrical rod protruding through a circular opening in the bottom of the vat, wherein the circular opening may comprise a sealing gasket around its rim to prevent the liquid from escaping from the vat through the opening while the movable support is moved through the opening. The displacement assembly may then drive a motion of the collector plate by displacing the movable support with respect to the vat.

The vat may be a tank with an open top for holding the liquid. In operation, the vat may hold the liquid at a predetermined filling level, such as a predetermined liquid volume or predetermined filling height. For example, the collector and the vat may be configured, such that a rise of the filling height while immersing the collector in the liquid is smaller than 2 mm or smaller than 1 mm, such as to only negligibly affect a deposition of the polymer material.

In preferred embodiments, the vat comprises a level control unit, in particular an overflow, for maintaining a constant filling height of the vat holding the liquid while the collector is retracted into the vat.

The constant filling height may substantially correspond to a target deposition distance between the print-head and the uppermost layer of the polymer material, such that the level control unit may prevent the liquid from reducing the target deposition distance while the liquid is displaced by the retracting collector. The skilled person will appreciate that the uppermost layer of the polymer material may lie above the surface of the liquid, such that the distance between the liquid surface and the nozzle may generally be larger than the target deposition distance, e.g. by a critical deposition height, such as 1 mm or 2 mm. By using an overflow as the level control unit, the filling height may be passively controlled with simple technical means. The overflow may also simplify filling the vat up to the predetermined filling level. In some embodiments, the liquid rises up to the constant filling height while the collector retracts away from the nozzle, e.g. due to a displacement of the liquid by the collector.

In preferred embodiments, the liquid is a dielectric medium, wherein a dielectric constant of the dielectric medium is in particular smaller than 50, preferably smaller than 30.

The polymer may have a dielectric constant which may be an order of magnitude larger than the dielectric constant of air and may accordingly bend the electric field lines in its vicinity. The path of the polymer material ejected from the nozzle may accordingly be distorted in the vicinity of polymer material received previously by the collector. The dielectric medium may equalize a dielectric constant below the surface of the dielectric medium. As the polymer material deposited by electro-spinning/writing can be porous, the dielectric medium can permeate the received polymer material on the collector for providing a substantially flat surface close to the uppermost polymer layers with a constant dielectric constant, such as to reduce an impact of the presence of the deposited polymer material onto subsequently received polymer materials. The dielectric medium may also shield charges of the deposited polymer material and thereby further increase a deposition accuracy of the system.

The dielectric medium may have a dielectric constant which is larger than the dielectric constant of air or the polymer material and may be smaller than 50 to reduce an effect of the liquid onto the electric field strength experienced by the polymer material ejected from the nozzle. For example, the liquid may be demineralized water, ethanol, isopropanol, methanol, phenol, chloroform, or oils. Preferably, the liquid has disinfecting properties for disinfecting the polymer material received on the collector plate.

In preferred embodiments, the liquid is (electrically) conductive and the vat and/or the collector is (electrically) grounded to maintain a constant electric potential of the liquid.

The conductive liquid may be at least dissipative to maintain a ground potential of the liquid. For example, a resistivity of the liquid may be smaller than $10^9$ $\Omega$m or smaller than $10^8$ $\Omega$m. The dissipative properties of the liquid may drain or shield charges from/in the received polymer material on the collector and may also allow providing a constant electric potential at the surface of the liquid. In some embodiments, the conductivity of the liquid is high, such as smaller than $10^6$ $\Omega$m or smaller than $10^5$ $\Omega$m, such that the liquid surface may act as a counter electrode for the electro-spinning/writing process.

The skilled person will appreciate that the liquid may have both dielectric and conductive properties. For example, demineralized water can be dissipative to drain charges from the polymer while also acting as a dielectric medium to at least partially offset an increased dielectric constant of the received polymer material on the collector for the electro-spinning/writing process. In some embodiments, the resistivity of the liquid is between $10^9$ $\Omega$m and $10^5$ $\Omega$m or between $10^8$ $\Omega$m and $10^6$ $\Omega$m.

In preferred embodiments, the controller is configured to maintain an upper surface of the received polymer material facing the print-head above the liquid surface of the liquid during the deposition of the polymer material.

In preferred embodiments, the controller is configured to retract the collector and at least a part of the polymer material received by the collector into the liquid in the vat in accordance with a height of the received polymer material, while a printing surface stays above the surface of the liquid in the vat.

According to a second aspect, the invention relates to a method for electro-spinning/writing of a polymer material. The method comprises providing the polymer material at a print-head, applying a voltage between the print-head and a collector facing the print-head, and initiating a stream of the polymer material from the print-head towards the collector. The method further comprises retracting the collector away from the print-head into a liquid along with an increase of a deposition height of the polymer material on the collector.

In some embodiments, one of the collector and the print-head is (electrically) grounded while a selectable electric potential is applied to the other one of the collector and the print-head for controlling a flow of polymer material from the nozzle towards the collector.

In preferred embodiments, the method further comprises (electrically) grounding the collector, and applying a selectable electric potential to a nozzle of the print-head for controlling a flow of polymer material from the nozzle towards the collector.

In preferred embodiments, the method further comprises maintaining a constant filling height of a vat holding the liquid while the collector is retracted into the vat.

In preferred embodiments, the collector comprises a collector plate facing the print-head and a movable support protruding through an opening in a bottom of the vat, and wherein the method further comprises retracting the movable support through the opening to adjust a relative position of the collector/collector plate with respect to the print-head.

In preferred embodiments, the method comprises immersing the collector into the liquid when the deposition height exceeds a height threshold.

In preferred embodiments, the liquid is a dielectric medium, wherein a dielectric constant of the dielectric medium is in particular smaller than 50, preferably smaller than 30.

In preferred embodiments, the liquid is conductive and the vat and/or the collector is (electrically) grounded to maintain a constant electric potential of the liquid.

In preferred embodiments, the method comprises retracting the collector away from the print-head into a liquid along with an increase of a deposition height of the polymer material on the collector to maintain substantially constant electric field properties between the ejecting nozzle and a printing surface.

In preferred embodiments, the method comprises retracting the collector and at least a part of the polymer material received by the collector into the liquid in a vat, while a printing surface stays above the surface of the liquid in the vat.

According to a third aspect, the invention relates to a computer program or computer program product comprising machine readable instructions, which when executed on a control system implement a method according to the second aspect or drive a system according to the first aspect.

DETAILED DESCRIPTION OF EMBODIMENTS

The features and numerous advantages of the system and corresponding method according to the present invention will best be understood from a detailed description of preferred embodiments with reference to the accompanying drawings, in which:

FIG. 1 schematically illustrates an example of an electro-spinning/writing system;

FIG. 2 schematically illustrates an example of a method for electro-spinning/writing of polymer structures extending along the build direction;

Figure 1:
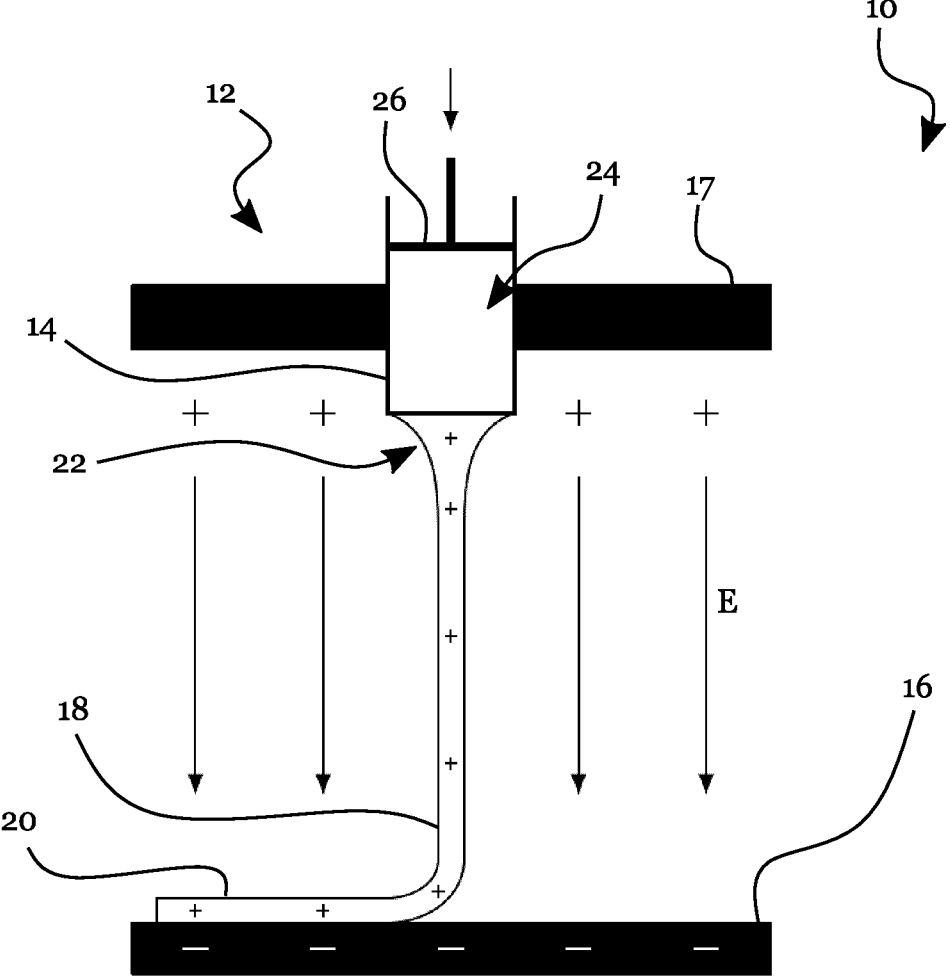

FIG. 1 schematically illustrates an electro-spinning/writing system 10 according to an example. The electro-spinning/writing system 10 comprises a print-head 12 with a conductive nozzle 14 arranged above a conductive collector plate 16. A voltage can be applied between the print-head 12 and the collector plate 16 (as illustrated by exemplary charges+/−at the print-head 12 and the conductive collector plate 16) via an electrode 17 and may induce an electric field (schematically illustrated by straight arrows "E") bridging the gap between the print-head 12 and the collector plate 16. A stream of polymer material 18 may be ejected from the nozzle 14 towards the collector plate 16 to form a layer of received polymer material 20 on the collector plate 16.

The print-head 12 and the collector plate 16 may be moved relative to each other in a transverse plane, such that the stream of polymer material 18 may be deposited as a polymer fiber on the collector plate 16, wherein the extension of the polymer fiber may substantially follow a direction of relative movement between the print-head 12 and the collector plate 16 in an electro-writing mode of the system 10. In an electro-spinning mode of the system 10, the fibers may be electrospun onto a predetermined deposition region, such that the orientation of the deposited polymer fibers may also be randomized in embodiments.

To drive a relative motion in the transverse plane and to define the geometry of the deposited polymer structure, the print-head 12 and/or the collector plate 16 may be coupled to a translation stage to drive a relative motion of the print-head 12 and the collector plate 16 in the transverse plane. For example, the print-head 12 may be mounted to a carriage (not shown) to be translated with respect to the collector plate 16 in a transverse direction, e.g. along perpendicular X/Y axes extending substantially parallel to the surface of the collector plate 16.

The polymer material 18 may be a dissolved polymer in a solvent or may be a polymer melt obtainable by heating a polymer base material 24, such as solid polymer granulates or polymer filaments, beyond its melting point. For example, polymer granulates may be heated in the print-head 12 and extruded through the nozzle 14, such as by pressuring the polymer melt with a piston 26, e.g. with pressurized air, for forcing the polymer melt through the nozzle aperture, as illustrated in FIG. 1. In some embodiments, the polymer base material 24 may be provided as a filament which is fed into the print-head 12 to be heated in the print-head 12 and extruded through the nozzle 14, e.g. while being pushed by the solid polymer filament (not shown).

The at least partially liquid polymer material 18 may be charged in the nozzle 14 (as schematically illustrated by positive charges in the polymer stream) and may be pulled from the nozzle 14 towards the collector plate 16. The electric forces acting on the polymer material 18 may induce a tapering 22 of the polymer material 18 at the nozzle 14. The tapering 22 may form an approximated Taylor cone from which a jet of charged polymer material 18 may be ejected towards the collector plate 16. As the polymer material 18 tapers away from the nozzle 14, a stream of the polymer material 18 between the nozzle 14 and the collector plate 16 may feature a smaller diameter than the diameter of the nozzle 14 and may be deposited as a polymer fiber in the layer of polymer material 20. For example, the polymer material 18 may be deposited as polymer fibers featuring a thickness of less than 100 µm, e.g. between 0.2 µm and 100 µm or between 5 µm and 50 µm, while the nozzle diameter may be between 0.1 mm and 0.4 mm.

The polymer material 18 may solidify during the passage between the nozzle 14 and the collector 16 by cooling and/or evaporation of solvent constituents, such that a viscosity of the polymer material 18 may increase towards the collector plate 16. Solidifying or solid polymer fibers may then be deposited on the collector plate 16 or on previously received layers of polymer material 20.

The system 10 may gradually deposit a plurality of layers of polymer material 20 on top of each other, wherein the geometry of each layer of polymer material 20 may differ to construct a three-dimensional shape from a plurality of essentially two-dimensional slices/layers. Depending on the distance and voltage between the nozzle 14 and the collector 16, the polymer fibers may be deposited at predetermined locations or deposition regions, to generate a deterministic geometry of received polymer material 20 on the collector 16. For example, a distance between the nozzle 14 and the collector 16 or the uppermost layer of received polymer material 20 may be between about 1.5 mm to about 10 mm, e.g. between about 2.5 mm and about 8 mm, to enable electro-writing with the polymer material 18.

In accordance with an increasing deposition height of the layers of polymer material 20 on the collector plate 16, a distance between the print-head 12 and the collector 16 may be adjusted, such that a distance between the nozzle 14 and the uppermost layer of polymer material 20 remains substantially constant. A substantially constant distance between the collector plate 16 and the uppermost layer of polymer material 20 may avoid proximity effects of the nozzle 14 onto the deposited layers of polymer materials 20, such as melting of previously deposited fibers, attraction of polymer material 18, 20 towards the nozzle 14, or distortion of the Taylor cone.

The voltage applied between the nozzle 14 and the collector plate 16 may be increased in accordance with the varying spacing between the collector plate 16 and the nozzle 14, such as to maintain a substantially constant electrical field at the nozzle 14 for inducing the tapering 22 and for controlling the flow of polymer material 18 from the nozzle 14 towards the collector plate 16. For example, a voltage of about 5 kV may be applied between the nozzle 14 and the collector plate 16 at a distance between the nozzle 14 and the collector plate 16 of about 3 mm, such as to deposit a solidifying polymer fiber in a predetermined location onto the collector plate 16, and the voltage may be increased in accordance with an increasing distance between the collector plate 16 and the nozzle 14.

In some embodiments, the distance between the nozzle 14 and the collector plate 16 may be larger than a critical distance for an Ohmic flow regime (electro-writing regime) of the polymer material 18, such that the polymer material 18 may be electrospun onto the collector plate 16 and previously received polymer material 20 in a convective flow regime, such as to deposit electrospun fibers in a predetermined deposition region.

Hence, three-dimensional shapes of the polymer material 18, 20 may be constructed by the consecutively deposited layers of polymer material 20. However, the layers of received polymer material 20 may locally influence the electric field distribution between the nozzle 14 and the collector plate 16 by their dielectric properties or by charges retained in the layers of received polymer material 20, such that a deposition accuracy may progressively reduce with increasing deposition height. Depending on the utilized polymer material 18 during deposition, charging effects of the polymer material 18, 20 may even prevent an ordered deposition of subsequent layers of received polymer material 20 above a certain critical deposition height.

FIG. 2 schematically illustrates a method for electro-spinning/writing of a polymer material 18 according to an example. The method comprises providing the polymer material 18, 24 at a print-head 12 (S10), applying a voltage between the print-head 12 and a collector 16 facing the print-head 12 (S12), and initiating a stream of the polymer material 18 from the print-head 12 towards the collector 16 (S14). The method further comprises retracting the collector 16 away from the print-head 12 into a liquid along with an increase of a deposition height of the polymer material 20 on the collector 16 (S16).

In the method of FIG. 2, the influence of the layers of received polymer material 20 may be at least partially mitigated by immersing the collector 16 and at least a part of the polymer material 20 received by the collector 16 in a liquid. The liquid may offset electrostatic effects of the deposited layers of a dielectric polymer material 20 due to a polarization of the liquid in the electric field, and may shield electric charges retained in the polymer material. In addition, the liquid may drain electric charges from the polymer material, and may in some embodiments present a substantially flat ground potential reference at the liquid surface. Accordingly, the critical deposition height for layers of received polymer material 20 may be increased.

Figure 3:
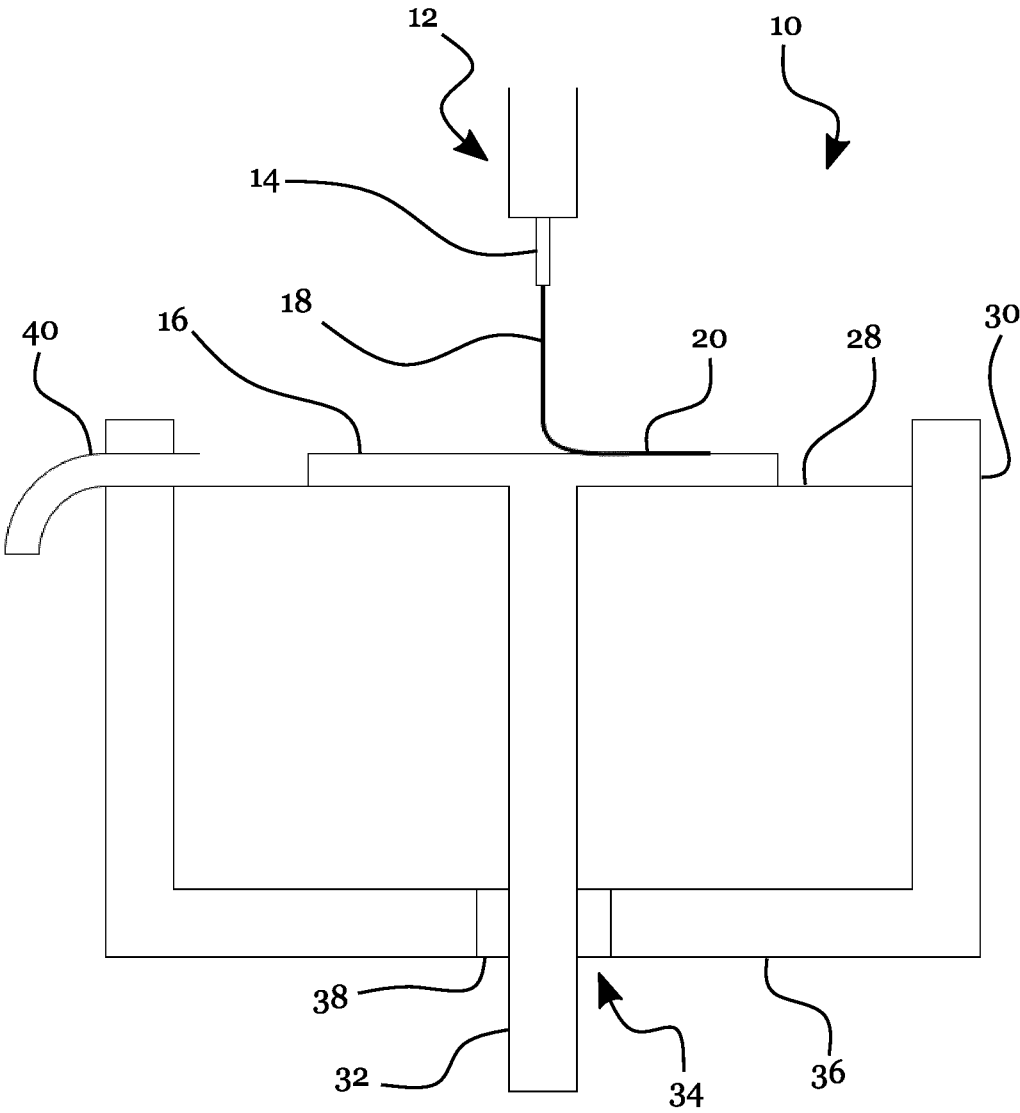
FIG. 3 illustrates a system for electro-spinning/writing of a polymer material, wherein the collector plate can be retracted into a liquid according to an example.

FIG. 3 illustrates a system 10 for electro-spinning/writing of a polymer material 18, wherein the collector plate 16 can be retracted into a liquid 28 according to an example. The system 10 comprises a print-head 12 configured to eject the polymer material 18 via a nozzle 14, and a collector plate 16 configured for receiving the polymer material 18 ejected from the nozzle 14. The system 10 further comprises a vat 30 containing the liquid 28, wherein the collector plate 16 is received in the vat 30.

The vat 30 may be an open tank with a cross-section of the vat 30 being larger than the collector plate 16 at least in a section of the vat 30, such as to receive the collector plate 16 and to enable movement of the collector plate 16 in the vat 30 over a (vertical) displacement distance to adjust a distance between the nozzle 14 and the collector plate 16. The vat 30 may feature a top opening to receive the polymer material 18 from the print-head 12 on the collector plate 16 as shown in FIG. 3. However, the vat 30 may also be a substantially closed tank, and the print-head 12 may be received in a top accommodating space of the vat 30 above the collector plate 16 and/or the intended filling height of the vat 30.

The print-head 12 may be mounted on a translation mechanism (not shown) to control a deposition of the nozzle 14 in a transverse direction with respect to the surface of the collector plate 16. By adjusting the transverse position of the nozzle 14 over time, a two-dimensional deposition pattern of the received polymer material 20 on the collector plate 16 can be controlled.

The print-head 12 may be driven to gradually deposit multiple layers of received polymer material 20 to construct a three-dimensional polymer structure with a pre-determined shape. In accordance with an increasing deposition height of the received polymer material 20, the collector plate 16 may be retracted away from the print-head 12 along the build direction to substantially maintain a constant distance between the nozzle 14 and the uppermost layer of received polymer material 20.

To displace the collector plate 16, the collector plate 16 can be mounted on a movable rod 32 protruding through an opening 34 in a bottom 36 of the vat 30 to be coupled to a displacement assembly (not shown). The displacement assembly can move the movable rod 32 through the opening 34 to change a relative position of the vat 30 and the collector plate 16. Hence, a distance between the print-head 12 and the collector plate 16 may be adjusted by driving a motion of the movable rod 32 via the displacement assembly, e.g. by driving an electric actuator, such as a stepper motor.

A sealing gasket 38 may surround the movable rod 32 and may seal the bottom 36 of the vat 30 to prevent a leaking of the liquid 28 from the vat 30, while the collector plate 16 is displaced along the build direction.

The collector plate 16 may rest in a starting position before initiating a deposition of an intended structure on the collector plate 16. In the starting position, the upper surface facing the print-head 12 may be positioned above a surface of the liquid 28, when the vat 30 is filled with the liquid 28 at a predetermined filling level, such as a predetermined filling volume.

As illustrated in FIG. 3, the vat 30 may comprise an overflow 40 at a sidewall of the vat 30, and the liquid 28 may be drained from the vat 30 through the overflow 40 above a pre-determined filling height associated with the vertical position of the overflow 40. In other words, the overflow 40 may define a maximum filling height for the liquid 28 in the vat 30.

In the starting position, the polymer material 18 may be deposited onto the surface of the collector plate 16, e.g. until a stable jet of polymer material 18 from the nozzle 14 towards the collector plate 16 is attained. The system 10 may then proceed to consecutively deposit layers of received polymer material 20 corresponding to an intended shape of a part on a predetermined portion of the collector plate 16.

While the layers of received polymer material 20 are deposited on the collector plate 16, the displacement mechanism may be driven to retract the collector plate 16 away from the nozzle 14, such that a distance between the nozzle 14 and collector plate 16 can be gradually increased, e.g. by retracting the collector plate 16 in accordance with a number of layers of received polymer material 20 in a stepwise manner. The retraction distance of the collector plate 16 may substantially correspond to a height of the layers of received polymer material 20 on the collector plate 16.

The displacement assembly should in particular be configured to retract the collector plate 16 and at least a part of the polymer material 20 received by the collector plate 16 into the liquid 28 in the vat 30 in accordance with a height of the received polymer material 20.

The upper surface of the collector plate 16 facing the print-head 12 may be retracted below the surface of the liquid 28, when the height of the layers of received polymer material 20 exceeds a height threshold. For example, the upper surface of the collector plate 16 may rest above the liquid surface by the height threshold in the starting position and may be immersed into the liquid 28 when the retraction distance exceeds the height threshold.

The height threshold for immersing the collector plate 16 into the liquid 28 may be selected in accordance with a deposition height below which the deposition of the layers of received polymer material 20 is known to be stable, e.g. a deposition height below which a presence of received polymer material 20 on the collector plate 16 only negligibly distorts the intended geometry of the received polymer material 20, such as 1 mm, 2 mm or 4 mm. The height threshold may be empirically determined, e.g. for a utilized liquid 28 and/or a deposited polymer material 18 and/or for a structure of the print-head 12 and/or the collector 16.

In some embodiments, the height threshold is selected, such that the liquid 28 does not cover the surface of the collector plate 16 due to capillary and/or electrostatic forces in the starting position.

In some embodiments, the filling height of the liquid 28 in the vat 30 may rise while the collector plate 16 is retracted due to a displacement of the liquid 28 in the vat 30 by the retracted collector plate 16, such that the height threshold may be different from a distance between the upper surface of the collector plate 16 and the liquid surface. The filling height may rise up to a predetermined filling height, e.g. a predetermined filling height defined by an overflow 40. In some embodiments, the vat 30 is dynamically filled with the liquid 28 before the deposition height of the received polymer material 20 exceeds the height threshold.

When the collector plate 16 is immersed into the liquid 28, an influence of the presence of received polymer material 20 on the deposition location of additional polymer material 18 due to electrostatic forces may be at least partially offset by the liquid 28.

Figure 4:
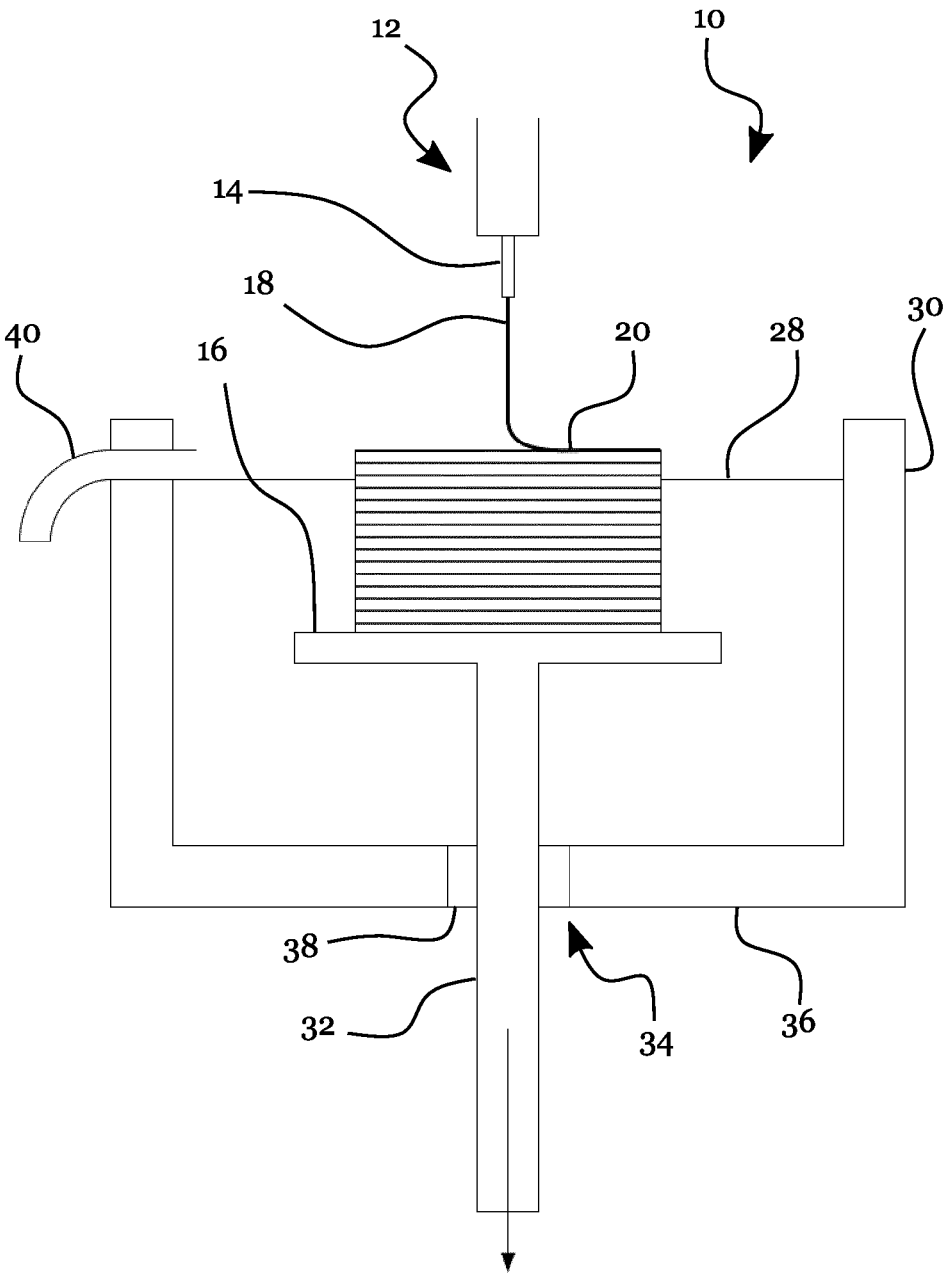
FIG. 4 illustrates the system of FIG. 3, wherein the collector plate has been retracted below the surface of the liquid in the vat.

FIG. 4 illustrates the system 10 of FIG. 3, wherein the collector plate 16 has been retracted below the surface of the liquid 28 in the vat 30. Accordingly, the received polymer material 20 on the collector plate 16 is partially immersed into the liquid 28 while an upper surface of the received polymer material 20 facing the print-head 12 rests above the liquid surface. The liquid 28 may permeate the layers of received polymer material 20 and may cover the upper surface of the collector plate 16 facing the nozzle 14, such as to provide a substantially flat surface facing the print-head 12 close to an upper surface of the received polymer material 20.

The liquid 28 may have a dielectric constant on the order of the dielectric constant of the received polymer material 20. The liquid 28 may then offset a spatially varying dielectric constant due to the presence of the received polymer material 20 and may thus at least partially offset a distortion of the flow of the polymer material 18 due to the presence of the received polymer material 20. However, the dielectric constant of the liquid 28 may also be greater or smaller than the dielectric constant of the received polymer material 20. For example, the dielectric constant of the liquid 28 may be greater than the dielectric constant of the received polymer material 20 to further reduce an effect of the presence of the received polymer material 20, or may be smaller than the dielectric constant of the received polymer material 20 to limit a voltage between the nozzle 14 and the collector plate 16 or to limit an influence of the electric field onto the liquid 28.

Figure 5A:
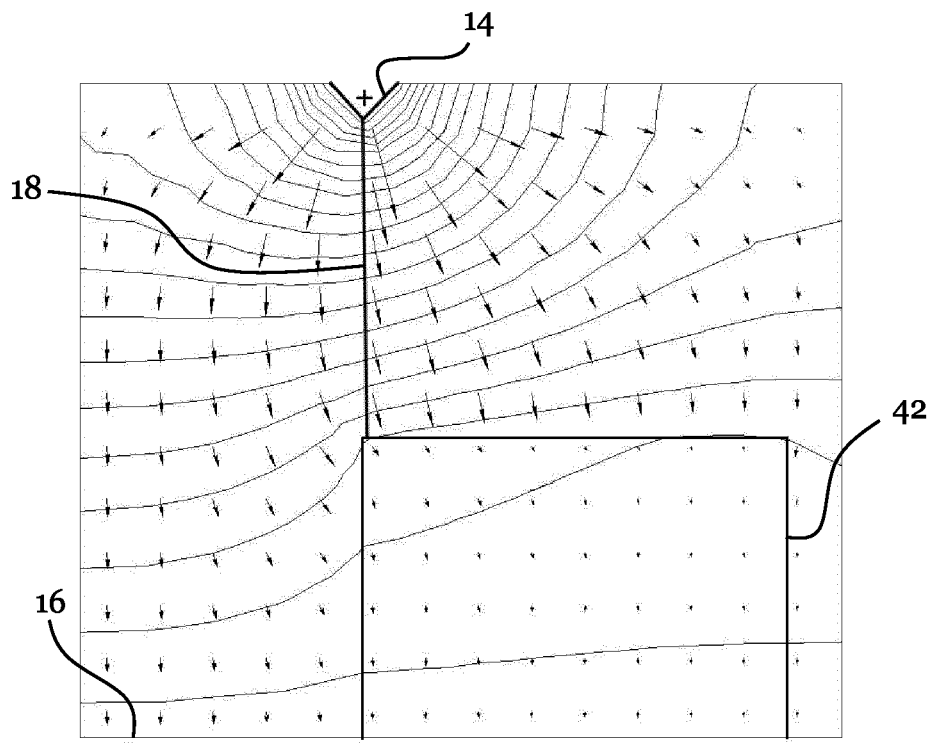
FIG. 5A, 5B show examples of electrostatic simulations for a solid polymer structure on a collector plate facing a charged nozzle without and with a liquid of equal relative dielectric constant, respectively.
Figure 5B:
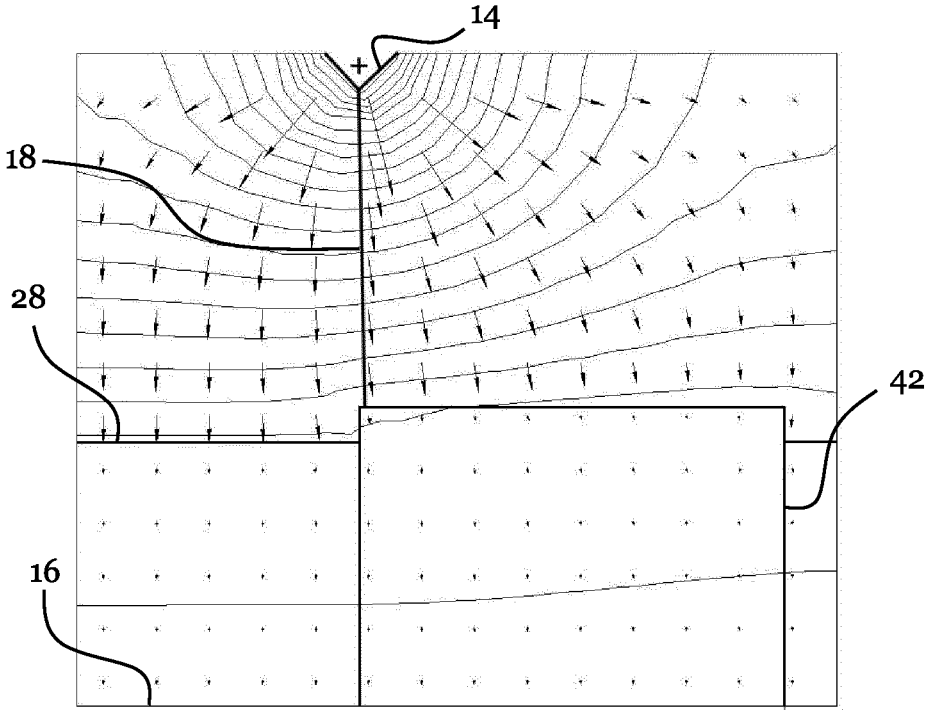

FIG. 5A, 5B show examples of electrostatic simulations for a solid polymer structure 42 on a collector plate 16 facing a charged nozzle 14 without and with a liquid 28 of equal relative dielectric constant ($\varepsilon_r$=6), respectively. A jet of polymer material 18 ejected from the nozzle 14 is shown below the nozzle 14 to illustrate the intended deposition direction. Equipotential lines of the electric field are illustrated by solid lines while the magnitude and strength of the electric field is indicated by the size and orientation of black arrows throughout the graph.

In FIG. 5A, no liquid 28 is present and the electric field bends in the proximity of the polymer structure 42 in the direction of the polymer structure 42 due to a polarization of the polymer structure 42 in the electric field. Hence, when additional polymer material 18 is deposited onto the polymer structure 42, the polymer material 18 may be pulled along the electric field lines towards the polymer structure 42.

FIG. 5B illustrates the same polymer structure 42, but the polymer structure 42 is partially immersed into a liquid 28 having equal dielectric constant. The liquid 28 is polarized in the electric field in accordance with its dielectric properties, such that a bending of the electric field lines towards the polymer structure 42 is partially offset, while the electric field may be aligned substantially parallel to the upper surface of the polymer structure 42, also close to the edges of the polymer structure 42. Accordingly, the flow of the polymer material 18 can be expected to be substantially along the vertical direction, such that the deposition accuracy and/or a maximum deposition height for the polymer material 18 can be increased.

Referring again to FIG. 4, the voltage between the print-head 12 and the collector plate 16 may be adjusted based on the distance between the collector plate 16 and the print-head 12 and/or based on an immersion depth of the collector plate 16 into the liquid 28. For example, the liquid 28 may reduce the strength of the electric field between the collector plate 16 and the print-head in accordance with the dielectric constant of the liquid 28, and the voltage may be adjusted in view of the presence of the liquid 28 between the collector plate 16 and the print-head 12. Preferably, the dielectric constant of the liquid 28 is smaller than 50 or 30 to limit a maximum voltage applied between the collector plate 16 and the print-head 12.

The liquid 28 may also shield electric charges below the surface of the liquid 28 and may also drain electric charges from the received polymer material 20, e.g. when the liquid 28 has dissipative properties and is electrically coupled to ground, such as via the collector plate 16. Accordingly, subsequent layers of the received polymer material 20 may be deposited with a reduced influence of electrostatic distortions caused by the increasing height of the layers of the received polymer material 20.

While the preceding examples have focused on a deposition of the polymer material 18 onto a collector plate 16 in a starting position above the liquid surface, the skilled person will appreciate that the collector plate 16 may also initially rest below the liquid surface. For example, the polymer material 18 may be deposited onto the collector plate 16 while the collector plate 16 is covered by a thin film of the liquid 28, or may be deposited onto a vertically protruding structure previously attached on the collector plate 16, e.g. onto a previously deposited polymer structure 42, while the collector plate 16 is immersed in the liquid 28.

The description of the preferred embodiments and the figures merely serve to illustrate the invention and the beneficial effects associated therewith, but should not be understood to imply any limitation. The scope of the invention is to be determined solely by the appended claims.

LIST OF REFERENCE SIGNS 10 system
12 print-head
14 nozzle
16 collector (plate)
18 polymer material
20 received polymer material
22 tapering/Taylor cone
24 polymer base material
26 piston
28 liquid
30 vat
32 movable rod
34 opening
36 bottom of the vat
38 sealing gasket
overflow
42 polymer structure

What is claimed is:

1. A system, the system comprising:

a print-head configured to eject the polymer material via a nozzle;

a collector configured to receive the polymer material ejected from the nozzle;

a displacement assembly configured to adjust a distance between the print-head and the collector; and a vat containing or configured to contain a liquid, wherein the vat is further configured to receive the collector; and wherein the system is configured to electro-spin/write a polymer material, and wherein the displacement assembly is configured to:

retract the collector and at least a part of the polymer material received by the collector into the liquid in the vat in accordance with a height of the received polymer material during a deposition of the polymer material on the collector, and maintain an upper surface of the received polymer material facing the print-head at a target deposition distance above the liquid surface of the liquid during the deposition of the polymer material as the received polymer material on the collector is partially immersed into the liquid, such that a distance between the liquid surface and the nozzle is larger than the target deposition distance.

2. The system of claim 1, wherein the system further comprises a heater configured to melt polymer material to form a polymer melt to be ejected through the nozzle.

3. The system of claim 1, wherein the system further comprises a voltage source configured to apply a selectable electric potential to one or both of the print-head and the collector.

4. The system of claim 3, wherein the collector is grounded, and wherein the nozzle is configured to be held at a selectable electric potential, wherein the selectable electric potential is suitable for controlling a flow of polymer material from the print-head towards the collector.

5. The system of claim 1, wherein the system further comprises a control system configured to control the displacement assembly such as to retract the collector further into the vat while the height of the received polymer material increases.

6. The system of claim 5, wherein the control system is configured to control the displacement assembly to immerse the collector into the liquid when the deposition height exceeds a height threshold.

7. The system of claim 1, wherein the collector comprises a collector plate facing the print-head and a movable support protruding through an opening in a bottom of the vat, wherein the displacement assembly is configured to move the movable support through the opening to adjust a relative position of the collector with respect to the print-head.

8. The system of claim 1, wherein the vat comprises a level control unit for maintaining a constant filling height of the vat holding the liquid while the collector is retracted into the vat.

9. The system of claim 1, wherein the liquid is a dielectric medium, wherein a dielectric constant of the dielectric medium is smaller than 30.

10. The system of claim 1, wherein the liquid is conductive and one or both of the vat and the collector is grounded to maintain a constant electric potential of the liquid.

11. The system of claim 5, wherein a retraction distance of the collector into the vat is proportional to the height of the received polymer material.

12. The system of claim 8, wherein the level control unit is an overflow.

13. The system of claim 3, wherein a voltage is applied between the collector and the print-head, wherein the voltage is suitable for controlling a flow of polymer material from the print-head towards the collector.

\* \* \* \* \*